Figure 1:
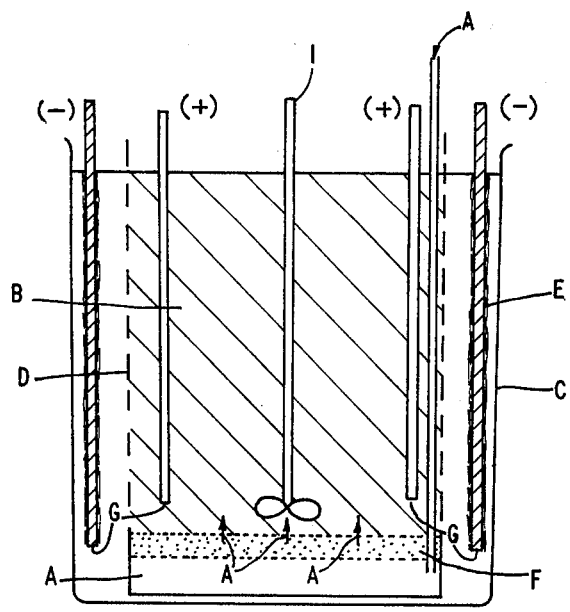

United States Patent [19]

Everett

[11] 4,061,552

[45] Dec. 6, 1977

[54] ELECTROLYTIC PRODUCTION OF COPPER FROM ORES AND CONCENTRATES

[75] Inventor: Peter Kenneth Everett, Chatswood, Australia

[73] Assignee: Dextec Metallurgical Proprietary Limited, Australia

[21] Appl. No.: 654,391

[22] Filed: Feb. 2, 1976

[30] Foreign Application Priority Data

Feb. 14, 1975 Australia .............................. 0615/75

[51] Int. Cl.$^2$ ............................................. C25C 1/12
[52] U.S. Cl. ................................................... 204/107
[58] Field of Search ........................... 204/107; 75/109

[56] References Cited

U.S. PATENT DOCUMENTS

| | | | |
|---|---|---|---|
| 3,687,827 | 8/1972 | Carpenter et al. .................. | 204/119 |
| 3,901,776 | 8/1975 | Kruesi et al. ........................ | 204/107 |
| 3,923,616 | 12/1975 | Atadan et al. ....................... | 204/107 |
| 3,926,752 | 12/1975 | Coretto et al. ...................... | 204/107 |

Primary Examiner—R. L. Andrews
Attorney, Agent, or Firm—Edgar N. Jay

[57] ABSTRACT

A process for extracting copper from a copper bearing ore or concentrate which comprises immersing the ore or concentrate in an electrolyte, intimately mixing with the slurry so formed finely dispersed air or other oxygen containing gas and maintaining the pH of the mixture at between 1,5 and 7,0 throughout the process. Iron is solubilized in the process and precipitated as ferric oxide and the copper is taken into solution. The process is conducted at substantially atmospheric pressure and at temperatures of from 50° C to the boiling point of the electrolyte. The electrolyte is acidic and contains chloride ions in a concentration between that sufficient to maintain in solution any cuprous ions present and saturation.

9 Claims, 2 Drawing Figures

ELECTROLYTIC PRODUCTION OF COPPER FROM ORES AND CONCENTRATES

This invention relates to the dissolution and recovery of copper from copper and iron bearing ores or concentrates particularly sulphide ores or concentrates. The invention allows at a low cost the substantially pollution free production of copper metal at substantially atmospheric pressure in a single step.

A well known prior art treatment for copper bearing ores particularly sulphides is the pyrometallurgical treatment of the ores. The pyrometallurgical treatment of sulphide ores is expensive, pollutes and requires the disposal of large quantities of sulphur dioxide or by-product sulphuric acid. To overcome the disadvantages of prior art pyrometallurgical processes, particularly pollution, a number of hydrometallurgical processes have been developed particularly aimed at the recovery of copper from ores containing chalcopyrite, malachite or azurite.

Chalcopyrite (Cu Fe $S_2$) is one of the most common copper materials and also one of the more oxidation resistant minerals, being reported as more noble or oxidation resistant than pentlandite, cobaltite sphalerite, galena, chalcocite and pyrrhotite (least resistant) and less noble than pyrite and molybdenite.

Chalcopyrite may be oxidized according to the equations:

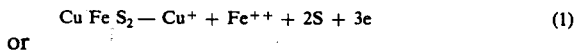

(1)

or

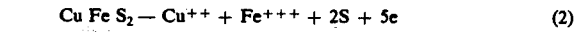

(2)

depending on the degree to which the oxidation is taken. Due to the instability of sulphur in alkaline oxidizing solutions, such reactions must be carried out at a pH of less than about 7.

This may be accomplished in autoclaves using high pressure air or oxygen in a similar manner to that described in Canadian Pat. No. 618,623 (for zinc ores) (Sherritt Gordon Mines Ltd.), however, the plant and operating costs are extremely high.

Australian patent application No. 52833/73 (The Anaconda Co.) describes a process for the treatment with oxygen of copper sulphides in an ammoniacal solution in low pressure autoclaves. The process is expensive, requires large amounts of ammonia, oxygen and a ready market for ammonium sulphate which is produced in quantities of five to ten times those of copper.

U.S. Pat. No. 3,673,061 (Cyprus Metallurgical Processes Corporation) describes the oxidation of copper sulphides at the anode of an electrochemical cell. The presence of iron in the ore results in a low anode current efficiency due to the power consumed by iron oxidation reactions, as is apparent from equations (1) and (2) above. From equation (1) it can be seen that a three electron exchange is necessary for the dissolution of one atom of copper while deposition would only require a one electron exchange thereby resulting in an anodic dissolution current efficiency of only 33% with respect to copper. To overcome this inefficiency it is necessary to produce electrolytic iron in amounts similar to those of copper and thereby requiring an equivalent market for the iron product which is produced by a very expensive method. In addition further care must be taken to avoid decreases in current efficiency due to further oxidation of elemental sulphur to sulphate. The process requires high anode current densities which result in increased anode wear and requires care in the electrolytic recovery of copper due to the high iron content of the electrolyte.

Australian patent application No. 54656/73 (Cyprus Metallurgical Processes Corporation) is very similar to the above patent and suffers from the same disadvantages.

Another Australian patent application No. 56990/73 (Hazen Research Inc.) discloses a process for the leaching of sulphide ores with ferric chloride which is regenerated anodically. The process requires a continuous electrolyte flow from the catholyte to the anolyte to avoid the severe reduction in current efficiency which would result from ferric ions reaching the cathode. There is also no provision for a method of overcoming the inefficiencies due to the presence of iron sulphides in the ore.

Australian patent application No. 46913/72 (Duval Corporation) describes a relatively complex cyclic process involving the ferric chloride and cupric chloride leaching of copper sulphide ores.

The process of this invention overcomes the disadvantages of the above processes and allows the single step conversion of chalcopyrite to elemental sulphur, iron oxide and metallic copper, (in relatively iron free solutions), at atmospheric pressure, without requiring the production of electrolytic iron.

The major difference between this invention and the prior art is the discovery of a method of oxidising copper bearing ores or concentrates, even ores containing chalcopyrite, with air at substantially atmospheric pressure and moderate temperatures (50° to 105° C) to produce ferric oxide and in the case of sulphide ores or concentrates to convert sulphide sulphur to elemental form and take the copper into solution. The equations for the oxidation of the copper in chalcopyrite can be represented as follows:

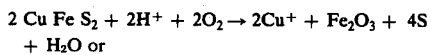

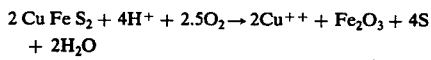

depending on the degree to which the oxidation is taken.

Broadly in accordance with the present invention there is provided a process for extracting copper from a copper and iron bearing ore or concentrate which comprises immersing the ore or concentrate in an electrolyte, intimately mixing with the slurry so formed finely dispersed air or other oxygen bearing gas at substantially atmospheric pressure and at temperatures of from 50° to the boiling point of the electrolyte, the said electrolyte being acidic and containing chloride ions in a concentration between that sufficient to maintain in solution any cuprous ions present and saturation, and maintaining the pH of the mixture at between 1.5 and 7.0 throughout the process, whereby iron solubilized in the process is precipitated as ferric oxide, and in the case of a sulphide ore or concentrate sulphide sulphur oxidisable under the conditions is substantially converted to elemental form and the copper is taken into solution.

One of the major advantages of the process of the present invention is that it can be operated under atmospheric pressure and consequently pressurised vessels do not have to be used. Although the process of the present invention would be operative at higher pressures, I confine the invention and claims to securing this advantage. Accordingly, the term "substantially atmospheric pressure" as used in this specification and claims means pressures other than pressures for which pressurised vessels are required.

As is evident from the equations given above depicting the reactions involved in the present process, both cuprous and cupric ions are formed and the relative proportions will depend on the length of time that the process has been operating and the specific conditions employed. It is necessary to have chloride ions present to ensure that cuprous ions remain in solution but the minimum amount necessary will vary according to the above factors and is, therefore, defined by result.

In one form of the invention hydrochloric acid is continuously or intermittently added to maintain the pH at the specified level and the copper is converted to ionic form in solution from which it may be obtained in elemental form by methods known per se such as by cementation or electrolytic deposition.

Alternatively, the pH may be controlled by the continuous or intermittent addition of acid anolyte from an electrochemical cell. The hydrogen ions in the anolyte are formed by the anodic oxidation of water and can be conveniently regenerated by return of the electrolyte to the cell for the precipitation of copper at the cathode and production of more hydrogen ions by oxidation of water at the anode. A preferred form of the invention is carried out by intimately mixing the ore or concentrate with air or other oxygen containing gas in the anode compartment of an electrochemical cell, and the copper can be continuously plated out at the cathode.

Accordingly in another form of the invention there is provided a process for extracting copper from a copper and iron bearing ore or concentrate and concomitantly plating out the extracted copper at the cathode of an electrochemical diaphragm cell which comprises immersing the ore or concentrate in an electrolyte in the anode compartment of the electrochemical diaphragm cell, intimately mixing the slurry so formed with finely dispersed air or other oxygen bearing gas at substantially atmospheric pressure and at temperatures of from 50° C to the boiling point of the electrolyte, the said electrolyte containing chloride ions in a concentration between that sufficient to maintain in solution any cuprous ions present and saturation, and passing current between the anode and cathode at a rate such that the hydrogen ions liberated at the anode maintain a pH of between 1.5 and 7.0 in the electrolyte, whereby the iron solubilised in the process is precipitated as ferric oxide, and in the case of a sulphide ore or concentrate sulphide sulphur oxidisable under the conditions is substantially converted to elemental form, and the copper is plated out on the cathode.

The processes of this invention can be catalysed at the start of the process by adding copper ions to the electrolyte.

Preferably the stream of air or oxygen bearing gas is introduced into the electrolyte in finely divided form. For best results, the gas stream should be finely divided enough to accelerate the reaction forming ionic copper, ferric oxide and elemental sulphur. For that purpose, a porous diffuser is used formed of any suitable material but having sufficiently small diameter pores, preferably less than about 0.02 inch. Good results were obtained using a diffuser made of porous graphite having an average pore diameter of about 0.005 inch.

The solubilised iron content of the electrolyte is preferably kept below 5 g.p.l. by control of the electrolyte oxidation potential.

The development of the process in relation to sulphide bearing ores resulted from a number of considerations:

Base metal sulphides tend to passivate during oxidation reactions much more readily in sulphate solutions than in chloride solutions and hence chloride solutions are used in the process of this invention. A further reason for this preference is that copper sulphides, particularly flotation concentrates froth vigorously on the introduction of air in sulphate solutions, with negligible frothing of most copper materials in chloride solutions. The chloride concentration used in the present invention is that sufficient to solubilise any cuprous iron present and saturation (see earlier equations).

Air is the cheapest and most readily available oxidising agent.

Elemental sulphur is a more desirable by-product than ammonium sulphate as large amounts of ammonia, and a large market for ammonium sulphate are not required. Due to the instability of elemental sulphur in alkaline oxidising solutions, a reaction pH of less than 7 is required. Iron oxide is a more desirable by-product than electrolytic iron due to the costs involved in production of the latter and the necessity of marketing equivalent quantities of copper and electrolytic iron, and therefore a reaction pH above 1.5 is necessary for the stability of the iron oxide product.

As can be seen by the earlier equations the process of the present invention oxidises the iron to a ferric oxide end product not ionic iron as in the prior art anodic oxidation processes. Therefore the loss in current efficiencies in the present process because of the presence of iron is near to zero compared to the loss in current efficiencies of between 60 and 70% of the prior art anodic oxidation processes. The economies of the process of the present invention are, therefore, far greater than those of the prior art.

Oxygen reactions in acid solution can be quite slow due to the kinetics involved. The $2H^+ + 0.5O_2 \rightarrow H_2O$ reaction has potentials of 1.229 volts in acid and 0.815 volts in neutral solution. In acid solution the reactions often involve slow rate determining steps such as the initial reduction of oxygen to peroxide. The air oxidation of ferrous ion to ferric ion in acid solution, contrary to the above potentials, proceeds only slowly. However, the reaction may proceed rapidly in low acid solutions when it involves the simultaneous precipitation of ferric oxide or hydroxide.

I have discovered a method of using air at atmospheric pressure and at temperatures above 50° C to accomplish the oxidation of chalcopyrite in the pH range of 1.5 to 7.0 according to:

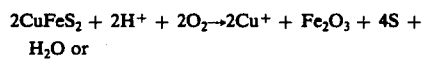
$2CuFeS_2 + 2H^+ + 2O_2 \rightarrow 2Cu^+ + Fe_2O_3 + 4S + H_2O$ or

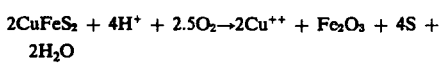
$2CuFeS_2 + 4H^+ + 2.5O_2 \rightarrow 2Cu^{++} + Fe_2O_3 + 4S + 2H_2O$ The following examples illustrate the air oxidation of chalcopyrite at substantially atmospheric pressure to form ferric oxide, elemental sulphur and ionic copper:

EXAMPLE I

One hundred grams of a chalcopyrite concentrate were agitated with one liter of electrolyte containing 200 g.p.l. of ammonium chloride and 2 g.p.l. of ionic copper in a beaker fitted with a porous graphite diffuser, having an average pore diameter of about 0.005 inch, covering the bottom.

Ninety mls of 5 Normal Hydrochloric acid were added slowly over a period of 6 hours to maintain a pH range of 2.0 – 2.5. The temperature was maintained at 85° C and air was admitted through the diffuser.

RESULTS

| Time (Hours) | Solution Analyses (g.p.l.) | |
| --- | --- | --- |
| | Cu | Fe |
| 0 | 2.2 | 0.01 |
| 1 | 10.4 | 1.8 |
| 2 | 16.8 | 2.0 |
| 3 | 20.2 | 1.4 |
| 4 | 23.6 | 0.8 |
| 5 | 25.6 | 0.7 |
| 6 | 26.8 | 0.2 |

| SOLIDS ANALYSES % | Copper | Iron | Elemental Sulphur |
| --- | --- | --- | --- |
| Copper Concentrate | 26.2 | 28.6 | — |
| Residue | 2.54 | 31.8 | 31.5 |

In excess of 90% of the copper was leached with a maximum electrolyte iron content of 2 g.p.l.

Similar results have been achieved with sodium, magnesium, zinc and manganese chloride electrolytes.

The air oxidation of chalcopyrite is ideally carried out at a pH of approximately 2.0 – 2.5 as shown in the following example.

EXAMPLE II

Three slurries of Chalcopyrite concentrate (100 g.p.l.) in 20% sodium chloride solution were maintained respectively in the pH ranges of 1 – 1.5, 2 – 2.5, 3 – 3.5 at 85° C in a beaker similar to that in Example I, while finely dispersed air was added through the porous cloth diffuser covering the bottom of the beaker.

| RESULTS (g.p.l.) | | | | | | |
| --- | --- | --- | --- | --- | --- | --- |
| pH Range: | 1 – 1.5 | | 2 – 2.5 | | 3 – 3.5 | |
| Time | Cu | Fe | Cu | Fe | Cu | Fe |
| 1 hr | 8.2 | 7.0 | 9.5 | 2.2 | 3.5 | 0.01 |
| 2 hrs | 12.8 | 11.5 | 14.2 | 1.8 | 5.5 | 0.02 |
| 4 hrs | 18.5 | 15.5 | 21.5 | 2.0 | 7.8 | 0.04 |
| 6 hrs | 20.0 | 18.0 | 23.0 | 0.6 | 9.5 | 0.03 |

The fastest rate of dissolution of copper occurred in the 2 – 2.5 pH range and the solution iron concentration was suitably low.

The oxidation is ideally carried out at a temperature in excess of approximately 70° C as indicated in the following example.

EXAMPLE III

Three slurries of chalcopyrite concentrate (100 g.p.l.) in 20% sodium chloride solution were maintained at pH 2.0 – 2.5 in a beaker similar to that in Example I and at temperatures of 70°, 80° and 90° C while finely dispersed air was admitted in a similar manner to Example I.

| RESULTS (g.p.l.) | | | | | | |
| --- | --- | --- | --- | --- | --- | --- |
| Temperature °C | 70° | | 80° | | 90° | |
| Time | Cu | Fe | Cu | Fe | Cu | Fe |
| 1 hr | 7.5 | 1.5 | 9.0 | 2.2 | 9.2 | 2.0 |
| 2 hrs | 13.0 | 1.4 | 14.4 | 1.6 | 15.0 | 2.8 |
| 4 hrs | 18.2 | 2.2 | 22.8 | 1.4 | 22.0 | 2.0 |
| 6 hrs | 20.2 | 1.1 | 24.5 | 0.8 | 24.7 | 1.6 |

A temperature of approximately 80° is preferred.

The equation for the anodic oxidation of water at the anode of an electrochemical cell is:

$$H_2O = 2H^+ + 0.5O_2 + 2e$$

This reaction has potential of 0.815 volts in neutral solution and 1.229 volts in 1 normal acid at which point the evolution of chlorine, in a chloride solution, becomes a competitive reaction.

Under the conditions used in this process the theoretical potential would be somewhere between these two values.

The cathode of the electrochemical cell may be used to plate copper according to $$2 Cu^+ \rightarrow 2Cu^* - 2e \text{ or}$$

$$2 Cu^{++} \rightarrow 2Cu^* - 4e$$

The overall cell reaction then becomes $$2 Cu Fe S_2 + 1.5O_2 \rightarrow 2 Cu^* + Fe_2O_3 + 4S$$

While it is possible to generate hydrogen ion at the anode of an electrochemical cell using a chloride electrolyte, only limited amounts may be generated before the evolution of chlorine becomes a competing reaction (depending on current densities, anode materials etc.).

FIG. 1 shows a cylindrical diaphragm cell which has a high anolyte volume for the treatment of low grade ores. Air is admitted through a porous diffuser at the bottom while current is passed between the graphite rod anodes and cathodes.

In FIG. 1, the arrows A indicate the direction of air flow into the cell. B is the slurry, C is a five liter beaker, D is the cell diaphragm, E is a copper sponge, F is porous graphite, G represents graphite electrodes and I is a mixing device that may be used if desired.

The chalcopyrite is converted to ferric oxide, elemental sulphur and ionic copper which diffuses through the porous diaphragm and deposits in an easily detached form at the cathode. The copper product may be removed from the bottom of the cell and recovered, for example, by filtration.

Figure 2:
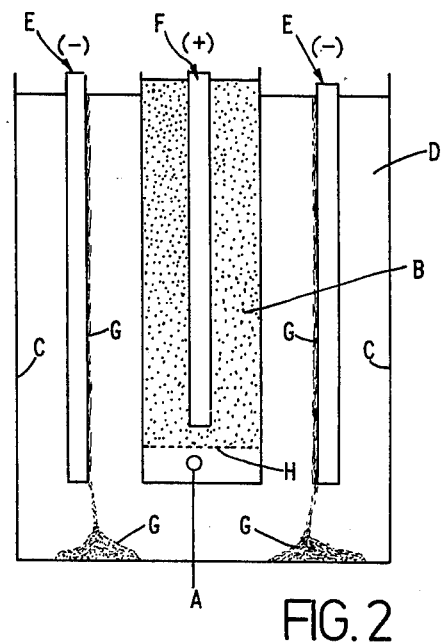

FIG. 2 shows a preferred form of cell for the treatment of copper concentrates, using conventional flat plate geometry.

In FIG. 2, A represents the air inlet, B is the air-/ore/electrolyte dispersion, C is a 5 liter container, D is the electrolyte, E represents the cathodes, F the anode, G is the copper product which forms on the cathodes and falls to the bottom of the container, and H is the porous diffuser.

The following example illustrates the direct conversion of chalcopyrite to copper metal, iron oxide and elemental sulphur.

EXAMPLE IV

A diaphragm of rectangular cross-section, constructed of polypropylene cloth was fitted with a polypropylene cloth air diffuser which covered the bottom of the anode bag. The anode bag was fitted with a grooved graphite plate to provide a high surface area anode.

The anode and anode bag were immersed in an electrolyte of composition 10 g.p.l. Cu and 20% sodium chloride in a ten liter container.

Graphite rods immersed in the electrolyte on the outside of the anode bag served as cathodes.

Three hundred and fifty grams of a chalcopyrite concentrate were added to the anode bag and air admitted in sufficient quantities to fluidize the ore and provide an excess of oxygen for the ore. Current was passed at the rate of 12 amps for 6 hours at a cathode current density of 300 amps/m$^2$ and an anode current density of 50 amps/m$^2$. Copper was collected from the electrodes and the bottom of the cell at the end of the reaction.

| RESULTS - (Temp = 85° C) | | | |
|---|---|---|---|
| Electrolyte Analysis | Cu (g.p.l.) | Fe(g.p.l.) | pH |
| Start | 10.4 | 0.1 | 4.5 |
| Finish (6 hours) | 8.5 | 1.4 | 2.7 |
| Solids Analyses | Cu % | Fe% | |
| Chalcopyrite | 25.2 | 27.2 | |
| Residue | 2.3 | 31.5 | |
| Product (90g) | 99.8 | .005 | |
| Cell Voltage | = 1.0 volts | | |
| Amp. hours consumed | = 72 | | |
| K.W.H./Kg | = 0.8 | | |

The residue was a red, easily filterable material analysing 31.5% S.

The type of residue formed is particularly important for the subsequent liquid/solids separation step and also for the deleterious effects on reaction rates caused by the formation of a gelatinous ferric hydroxide precipitate. To this end it has been found beneficial to pulse the air stream, for example, thirty seconds every minute. The mechanism to account for this improvement may involve the diffusion of ferrous ion away from the ore particles before precipitation as ferric oxide.

The use of the above conditions to eliminate iron from the electrolyte greatly facilitates the treatment of oxidised copper ores such as malachite and azurite. These minerals are often treated by dissolution in sulphuric acid, followed by electrolysis or cementation on scrap iron. Where the ore exists with large quantities of acid soluble iron, calcium magnesium etc. the process becomes a large acid consumer rendering many deposits uneconomic.

An alternate method using ammonium carbonate is expensive, complex and produces a copper oxide product.

Using the conditions previously described, it is possible to selectively leach copper, silver etc. in the presence of iron, and also calcium and magnesium (depending on their chemical form), thereby minimizing the consumption of reagents.

The use of air or high temperatures is necessary only if sulphides are present, the air, however, provides a convenient method of suspending the ore.

EXAMPLE V

Two kilograms of oxidised ore assaying 2.4% Cu were suspended above the air diffuser in the anode compartment of a cylindrical diaphragm cell with four liters of electrolyte containing 200 g.p.l. of NH$_4$Cl and ten g.p.l. of copper in solution at a temperature of 90° C.

Current was passed between the graphite anodes and cathodes at current densities of 50 amps/m$^2$ and 300 amps/m$^2$ respectively for six hours.

Copper, which deposited at the cathodes in easily detachable form, was filtered, washed, dried and weighed, as was the residue. The following results were obtained.

| | Cu | Fe | Ca | Mg | Pb | Zn | Ag |
|---|---|---|---|---|---|---|---|
| | % | | | | ppm | | |
| Ore | 2.4 | 9.0 | 7.7 | 8.9 | 160 | 160 | 7 |
| Residue | 0.2 | 8.8 | 7.6 | 8.5 | 80 | 80 | 1 |
| Product | 99 | 0.007 | nil | nil | 20 | 20 | 125 |

Cell voltage = 0.8v; current consumed = 1.1 amp hr/gCu;
Power consumed = 0.88 KWH/KgCu.

The above results show that in excess of 90% of the Cu and 85% of the Ag was leached and recovered, while only small amounts of Fe, Ca and Mg were leached. The cell voltage of 0.8v is very low and, hence, power costs in the use of the process are also very low.

It follows that the process is suitable for the treatment of sulphides, oxides and mixed sulphide/oxide ores, providing the advantages of:

1. Very low power costs, basically unaffected by the presence of iron sulphides;
2. Ability to be operated either as a batch process with very simple equipment allowing small scale operations (e.g. at the mine site), or as a continuous process on a larger scale;
3. Not necessarily consuming acid, as in the sulphuric acid cementation process;
4. Being non-polluting and producing elemental sulphur (which may be recovered) rather than sulphur dioxide or by-products such as ammonium sulphate;
5. Not consuming larger quantities of reagents, and
6. Producing an easily filterable residue.

The use of chalcopyrite in the examples described is because it is one of the most common of the sulphide ores of copper, is reported to be the most noble and difficult to decompose of the sulphides of copper, and creates severe treatment problems due to the large amounts of chemically bound iron. In general, other sulphides of copper are more easily treated by this process than chalcopyrite.

What I claim is:

1. A process for extracting copper from a copper and iron bearing ore or concentrate and concomitantly plating out the extracted copper at the cathode of an electrochemical diaphragm cell which comprises forming a slurry of the ore or concentrate with an electrolyte in the anode compartment of the electrochemical diaphragm cell, intimately mixing finely dispersed oxygen bearing gas with the slurry and maintaining the slurry and the mixture at substantially atmospheric pressure throughout the process and at a temperature of from 50° C to the boiling point of the electrolyte, said electrolyte containing chloride ions in a concentration between that sufficient to maintain in solution any cuprous ions present and saturation, and passing current between the anode and cathode at a rate such that the hydrogen ions liberated at the anode maintain a pH of between 1.5 and less than 7.0 in the electrolyte throughout the process, whereby the iron solubilized in the process is substantially simultaneously precipitated as ferric oxide and sulphide sulphur oxidised under the conditions is substantially converted to elemental form and the copper is plated at the cathode.

2. A process as claimed in claim 1 in which the solubilized iron content in the electrolyte is kept below 5 g.p.l. by control of the electrolyte oxidation potential.

3. A process as claimed in claim 2 in which the pH is maintained between about 2.0 to 2.5.

4. A process as claimed in claim 3 in which the temperature of the mixture is about 70° to 90° C.

5. A process as claimed in claim 2 wherein the copper and iron bearing ore or concentrate contains chalcopyrite.

6. A process as claimed in claim 2 wherein the copper and iron bearing ore or concentrate contains malachite or azurite.

7. A process as claimed in claim 2 wherein a pulsating stream of air or oxygen bearing gas is introduced into the electrolyte.

8. A process as claimed in claim 2 wherein the air or oxygen bearing gas is introduced through porous graphite.

9. A process as claimed in claim 2 in which at the start of the process copper ions are added to the electrolyte to act as a catalyst.

* * * * *